March 31, 1942.  L. JUROVATY  2,277,865
DENTAL FLOSS APPLICATOR
Filed March 10, 1941
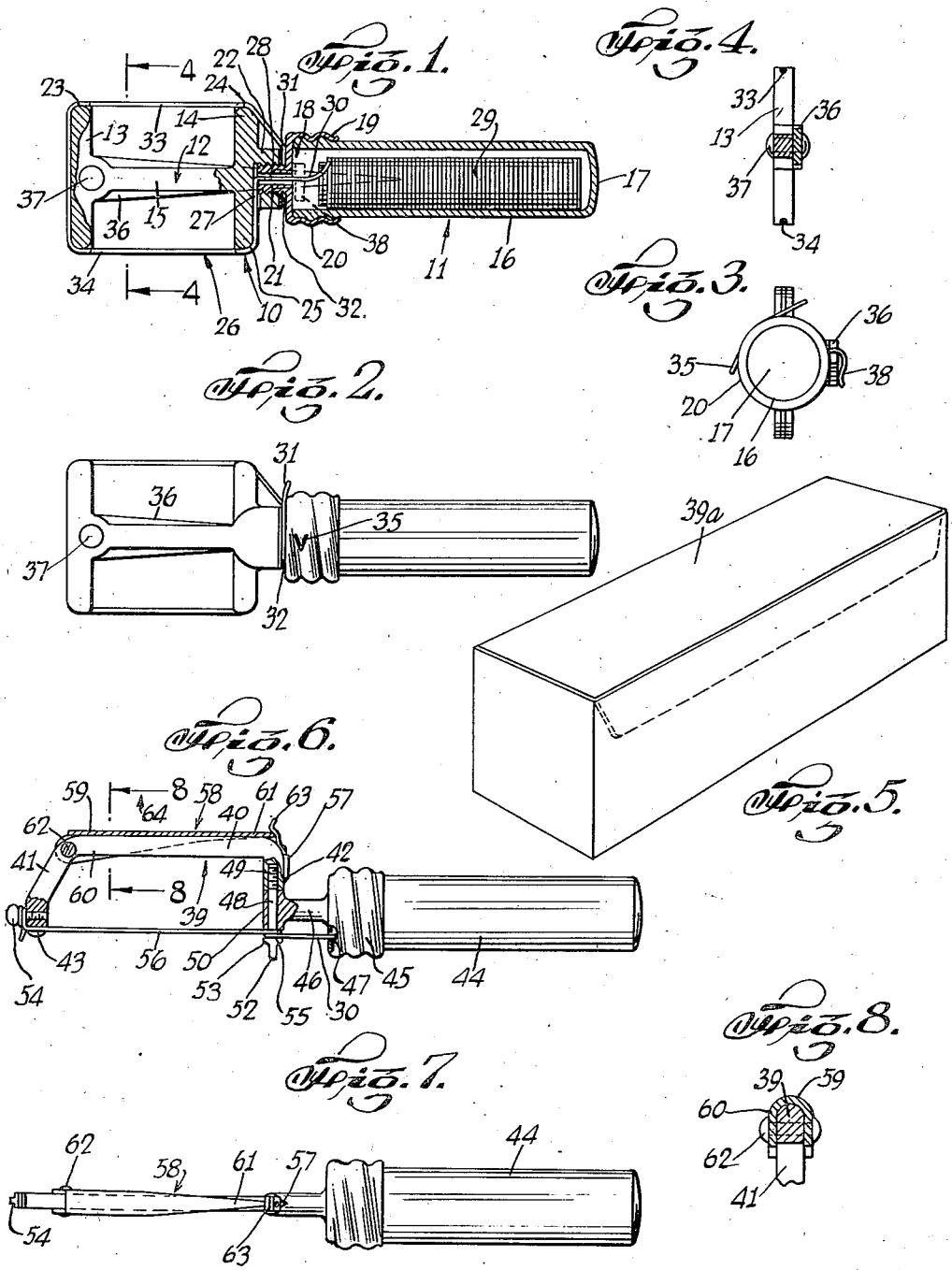
INVENTOR
LUDWIG JUROVATY
BY
Carl Miller
ATTORNEY Patented Mar. 31, 1942

2,277,865

UNITED STATES PATENT OFFICE 2,277,865

DENTAL FLOSS APPLICATOR

Ludwig Jurovaty, New York, N. Y.

Application March 10, 1941, Serial No. 382,525

1 Claim. (Cl. 132—92)

This invention relates to combination dental floss applicators, and has for its main object to provide a device by which dental floss may be applied, and teeth cleaned by it, in a more efficient, easier, more pleasant and sanitary manner than it is possible with the devices used with dental floss for such purpose at present.

It is a well known fact that dentists recommend the use of dental floss for cleaning the teeth, as more sanitary, more hygienic, and less harmful than the ordinary wooden toothpicks, but that the application and use of dental floss is rather awkward, slow, cumbersome and unpleasant, particularly if another person applies it, like when a dentist is cleaning a patient's teeth through the use of dental floss, and has to insert his fingers, or even a large part of his hand into the mouth of the patient.

This invention aims to remedy the defects and drawbacks accompanying the use of dental floss at present, and to provide a device by which teeth may be cleaned by dental floss in a quicker, easier, more pleasant and more sanitary manner than has been done heretofore, and has been indicated hereinabove.

Another object of my invention is to provide a combination holder and applicator, and also carrier, for a supply of dental floss, the carrier being a part of the applicator device, preferably to be used as a handle or grip for the same.

Still another object of my invention is to provide a device of the character mentioned, which will have a dental floss applicator and carrier, which will be of the most sanitary type, and which may be folded into a smaller space along the applicator, and in a protected position when not in use, but which still will be available to an almost instant use in an efficient and expeditious manner when needed.

As other objects of my invention, I may mention: to provide a device as characterized hereinbefore, which will be foldable to be carried in the pocket of the user, will be simple in construction, light in weight, inexpensive to manufacture, easy to use, in which provisions are made to easily discard the used part of the dental floss, and insert a new portion thereof into the applicator, and in which the supply of dental floss may be easily and readily replaced when used up.

Further objects and advantages of the present improved construction will become apparent as the description proceeds, and the features of novelty will be pointed out in particularity in the appended claims; and the invention accordingly comprises the features of construction, combination of elements and arrangement of parts, which will be exemplified in the construction hereinafter set forth, and the scope of the application of which will be indicated in the claims.

In general terms, the present invention embraces an applicator proper, being in the form of a frame, over an open, exposed portion of which the dental floss to be used may be stretched, and temporarily removably secured in such position, and a handle and carrier portion into which a spool of dental floss may be inserted, and from which it may be fed over the said frame.

Means are provided to sever the used portion of the dental floss after it has been removed from the frame, to feed a new fresh portion of it on said frame, and to insert a new fresh spool or supply of dental floss into the carrier and handle portion.

In a modification of my invention, said handle and carrier portion may be pivoted on said applicator proper or frame portion, to make the device foldable. A toothpick device may be pivoted in an appropriate manner on an element of the said frame, normally being in an inoperative folded position, but being adapted to be turned on its pivot into an operative position when desired.

Referring now to the drawing accompanying the specification, and forming a part thereof, and in which, Fig. 1 is a longitudinal, sectional, elevational view of my combined dental floss applicator, and carrier, and toothpick device, in an operative position, the toothpick, however, being folded along the frame thereof into a position when not in use;

Fig. 2 is an elevational view of the same;

Fig. 3 is an end, elevational view from the right hand side of the device, as shown in Figs. 1 and 2;

Fig. 4 is a sectional, elevational view, the section being taken on the line 4—4 of Fig. 1;

Fig. 5 indicates a small container or carrier box for the device;

Fig. 6 is a side elevational view of a modification of my invention, partly in section;

Fig. 7 is a plan view of said modification; and

Fig. 8 is a fragmentary, sectional, elevational view, the section being taken on the line 8—8 of Fig. 6.

Referring now to the drawing, more in detail by characters of reference, and to Figs. 1 and 2, showing the preferred embodiment of my device, the numeral 10 indicates the applicator proper or frame portion of my device in general, and the numeral 11, the handle and carrier portion.

An I-shaped, comparatively thin and light frame 12, is provided in the applicator portion, having a transverse outer member 13, a similar, transverse, inner member 14, and the connecting central, longitudinal member 15. The handle or grip portion 11 consists of a tubular member 16 with an outer closed end 17, and an open, inner termination 18, the wall thereof adjacent to said inner termination showing the screw threads 19. Screw threaded cap 20 closes the open end 18, having a screw threaded sleeve projection 21 of reduced diameter, and being secured into a threaded socket 22 on the inner transverse member 14 of the frame 12.

A groove or slot 23 is provided on the upper, lower, and outer sides of the transverse member 13, and a short groove 24 is arranged in the upper part of the inner transverse member 14, while a similar groove 25 is provided in the lower half of said inner transverse member 14, being adapted to receive a dental floss, generally indicated by the numeral 26, in the manner indicated in the drawing. Hole or bore 27 continues the lower inner groove 25 and connects with the inner bore or space 28 in the screw threaded projection 21.

A usual spool or roll 29 of dental floss is arranged in the tubular handle 16, and the free end of the dental floss 30 is drawn through the holes 28, 27, and applied around the frame 12 in the respective grooves 25, 23 and 24, the termination 31 thereof preferably being tightly wound around the threaded sleeve 21, between the opposing faces of the cap 20 and socket 22, an appropriate space, indicated by the numeral 32, being left between said faces, for this purpose.

The use and operation of my improved dental floss applicator, is as follows:

As has been mentioned in the description of the preferred embodiment of my device, the dental floss 30 will be drawn through the holes or bores 28 and 27, as indicated in Fig. 1, and as it will be obvious; then tightly stretched over the frame 12 in the respective grooves recited hereinbefore, the terminal portion 31 of it being wound tightly around the screw threaded sleeve 21 in the space 32, whereupon the grip portion 16, and the cap 20 therewith, will be turned on the mentioned screw threads in such a manner as to tightly press the terminal portion of the dental floss between the mentioned two faces of the frame, and the cap 20, in the space 32, and thereby lock the stretched dental floss on the frame 12. In such position, both the upper accessible free portion 33, as well as the lower, similar portion 34 of the dental floss, stretched over the frame, may be inserted between the teeth and moved in the usual reciprocating motion, to clean the spaces between the teeth.

When the cleaning of the teeth is effected, the terminal portion 31 of the stretched operative part of the dental floss will be released by rotating the cap 20 in the opposite direction, to that mentioned hereinbefore, and widening the space 32, whereupon the portions of the dental floss in the various grooves, and in the operative parts 33 and 34, will all be released and removed from their described positions, the thus loosened used portion of the dental floss then being severed and discarded. A new portion of the dental floss will then be drawn through the mentioned holes from the spool 29, stretched over the frame, and its end secured in the manner described hereinbefore, when the device will be ready for a new use.

For an easier separation of the used part of the dental floss, a knife device 35 may be provided on the cap 20, preferably simply being struck out of its material, as is well known in the art.

An elongated, triangular toothpick member 36 may also be arranged on my frame 12, pivoted as at 37, and normally being folded alongside of the central, longitudinal element 15 of the frame, as indicated in the drawing.

It will be obvious that in case it is desired to use said toothpick, the same may be turned on its pivot 37 into a directly opposite position, projecting outwardly from the outer transverse member 13, and used as a usual toothpick. I prefer to make said toothpick of Celluloid, stainless steel, or any other durable, sanitary material recommended and approved by the dental profession.

A spring catch 38 may also be provided as indicated in Figs. 1 and 3, to hold the toothpick 36 in its folded inoperative position.

The refilling of my device will be obvious from the herein description of the construction thereof, and it may be effected in the following manner:

When the spool 29 of the dental floss has been used up, the tubular grip 16 with its cap 20 will be removed from the threaded socket 22 of the inner frame member 14, by unscrewing the same, whereupon the cap 20 will be removed. A new spool 29 is then placed in the tubular handle 16, its free end 30 being drawn through the bore 28, whereupon the cap 20 will be screwed tight on the handle 16. The free end of the dental floss will now be drawn through the bore 27, and the screw threaded projection 21 of cap 20, screwed back into the socket 22.

A box or casing 39a, indicated for the purpose of making the specification more complete, in Fig. 5, may be used for storing, shipping or carrying my device in the handbag, pocket, etc. of the user.

In Figs. 6 and 7, I show a modification of my invention, in which only one operative accessible stretched portion of the dental floss is provided, but which may be made somewhat narrower, smaller, and easily foldable, to make it adapted for pocket use.

In said modification, the frame member is indicated generally by the numeral 39, and has a longitudinal portion 40, placed at one side thereof, an inclined, outer, transverse member 41, and an inner, transverse member 42, and only a short groove 43 is provided at the free end of the outer transverse member 41. The carrier and grip member 44 is similar to the one described in connection with the preferred embodiment of Figs. 1 and 2, and is provided with the screw threaded cap 45. Said cap, however, has a solid extension or projection 46 in its center, and the dental floss 30 is fed out of the carrier 44, through a hole 47 in the top of the cap 45. A pivot pin 48 is secured into the inner transverse frame member 42, as by the screw threaded engagement, indicated at 49, and a transverse hub or sleeve 50 on the projection 46 of the cap 45, is rotatable on the pin 48.

A grip 52 is provided at the outer free end of the pivot pin 48, having a flange 53, opposite the hub or sleeve 50, and a wing bolt or screw 54, is arranged in the outer, transverse frame member 41.

The use and operation of this modified form of my device, will, again, be as follows:

The dental floss 30 is fed out of the carrier 44, the screw threaded pivot 48 and the wing screw or bolt 54 being first moved outwardly from their respective sockets by an appropriate turning thereof. The dental floss 30 will be wound or turned around the pivot 48 at the flange 53, whereupon said pivot pin will be tightened, flange 53 locking the windings 55 of the floss between itself and the hub 50, as it will be obvious.

The future operative portion 56 of the dental floss will now be stretched out between pivot 48 and the wing screw 54, its outer end being applied into the groove 43, and wound around said screw, whereupon screw 54 will also be tightened. The device is now ready for the cleaning operation in an obvious manner, similarly to the one described hereinbefore.

After the cleaning of the teeth is effected, screw 54 and pivot 48 will be loosened, the used part of the dental floss unwound and removed. Here again, a knife 57 may be provided, as on the inner frame member 42, and being of any appropriate construction, well known in this art, for cutting off the used portion of the dental floss.

A pivoted toothpick device 58 is also provided with the modified form of my invention, the toothpick having a bottom portion 59, and two side walls 60 going along a portion of said bottom portion, in a gradually converging manner thereto, said bottom portion having the pointed end 61 to be used as a toothpick proper. A pivot 62 is also provided on the frame 39, engaging the wider inner ends of the side walls 60. Normally the toothpick device is in the position, indicated in Figs. 6 and 7, and it may be kept in such folded inoperative position by a spring catch 63 of obvious construction. When it is desired to use the toothpick, spring 63 will be moved outwardly, the end 61 of the toothpick released therefrom, and swung outwardly, as indicated by the arrow 64, into an operative position opposite to its folded position, shown in the drawing.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

A dental floss applicator and carrier comprising a frame having a longitudinal portion and an inner and an outer transverse member projecting from the ends of said portion, said inner member having a threaded opening, a pivot pin having a threaded end operable in said opening, a hollow handle having a cap, said cap having a solid projection terminating in an apertured hub, the aperture in said hub receiving the unthreaded portion of said pivot pin for pivotal mounting of said handle thereon, said outer terminal portion having a threaded screw, said cap having an aperture therein, said hollow handle adapted to receive a supply of dental floss to be fed thru the aperture in the cap, and said pivot pin and threaded screw adapted to have the fed-portion of the floss wound therearound to lock same on the frame.

LUDWIG JUROVATY.